Jan. 29, 1952     T. S. PERRIN ET AL     2,583,591
METHOD FOR RECOVERY OF VANADIUM-FREE CHROMATE
Filed Nov. 13, 1948
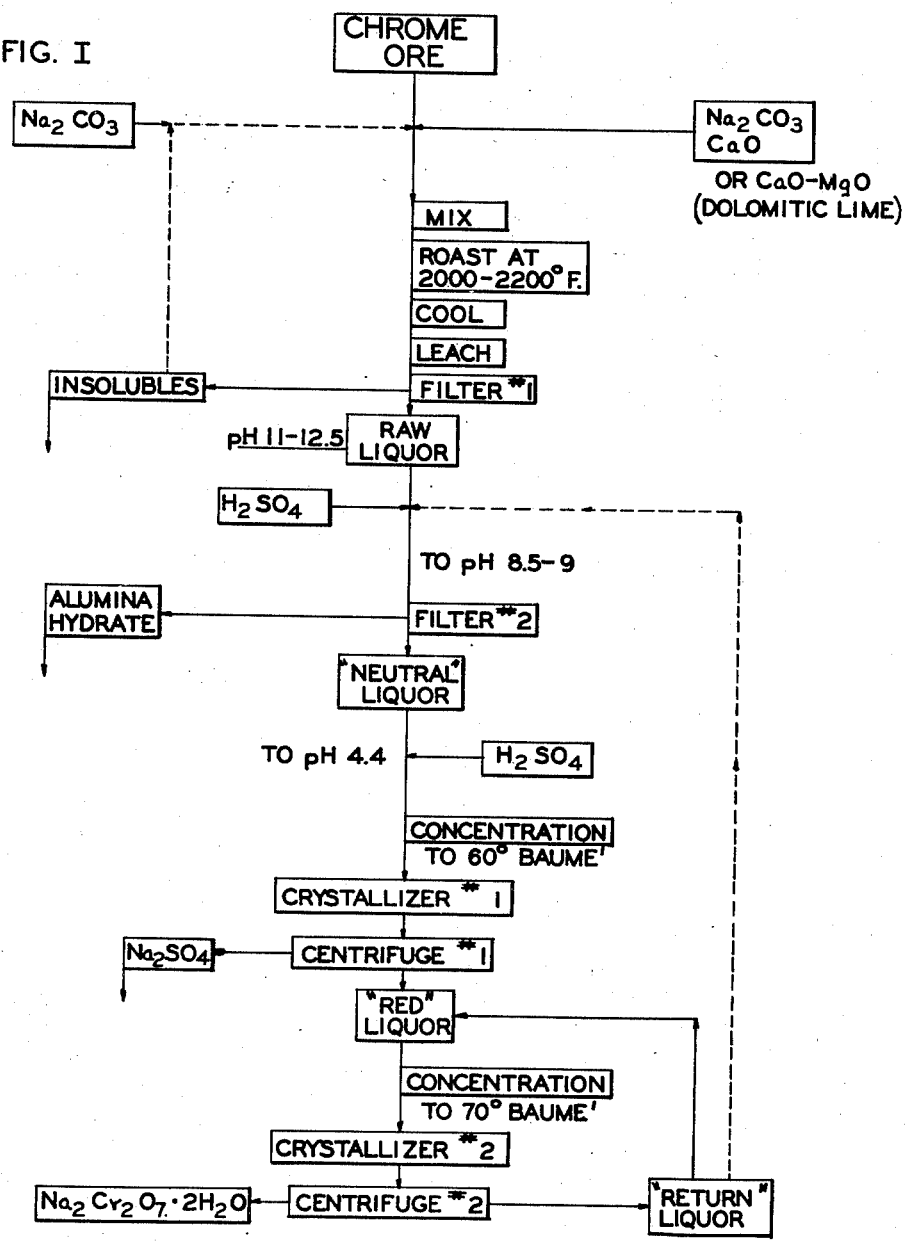
FIG. I
TOM S. PERRIN
JAMES N. JENKINS     Inventor
By Thornton F. Holder
Attorney

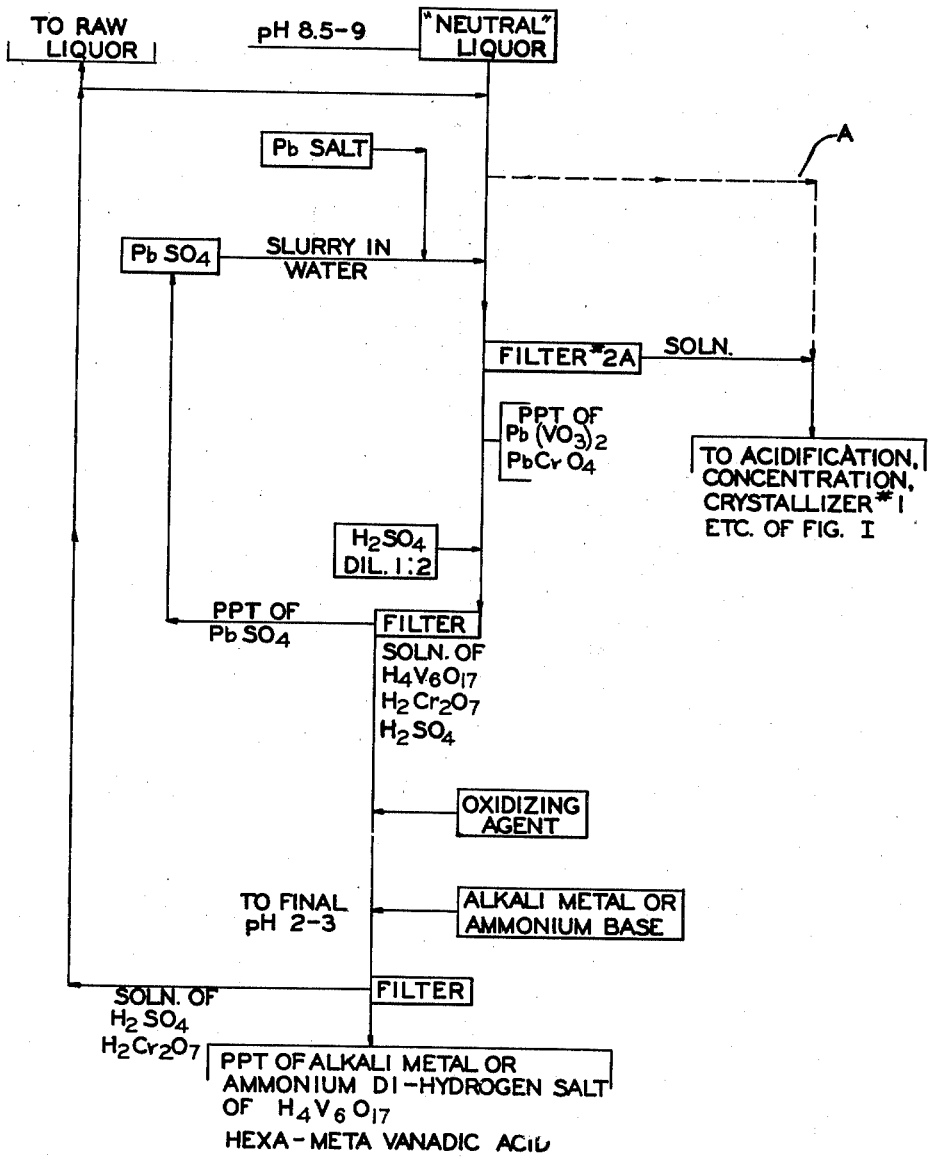

Patented Jan. 29, 1952

2,583,591

UNITED STATES PATENT OFFICE 2,583,591

METHOD FOR RECOVERY OF VANADIUM-FREE CHROMATE

Tom S. Perrin and James N. Jenkins, Painesville, Ohio, assignors to Diamond Alkali Company, Cleveland, Ohio, a corporation of Delaware Application November 13, 1948, Serial No. 59,935

10 Claims. (Cl. 23—51)

This invention relates to a method for removing vanadium salts from solutes comprising alkali metal chromates and alkali metal vanadates, and more particularly relates to a continuous cyclic method for removing vanadium salts from such solutions, in which method the vanadate sequestering agent is recovered directly and recycled in the process in the form recovered, whereby solutions of alkali metal chromates are obtained substantially free from vanadium salts, and vanadium in the form of a commercially saleable compound is recovered. The method has particular applicability in systems comprising predominantly chromium salts and containing only minor proportions of vanadium, such as leach liquors from chrome ore roasts.

It has heretofore been proposed to recover vanadium values generally associated with aqueous liquors containing chromate salts, such, for example, as the aqueous leach liquors obtained from the alkali roasting of chromite ores. Specifically, it has been proposed to recover vanadium values from such liquors by a method which consists essentially in acidifying the aqueous leach liquors with sulfuric acid to about pH 4.4, to form bichromate, fractionally crystallizing alkali metal sulfate from the liquors, filtering the crystallized alkali metal sulfate, concentrating the filtrate, and crystallizing alkali metal bichromate. The alkali metal bichromate is separated from the mother liquor, for example, by centrifuging, and finally the pH of the mother liquor is adjusted to about 1.7, whereby vanadium is precipitated and recovered as vanadium oxide or a hydrate thereof. This process has many disadvantages, the principal one of which lies in the step of precipitating chrome values in a vanadium bearing solution whereby an appreciable quantity of vanadium co-precipitates with or is carried by the chrome values and clean separation is therefore precluded. Moreover, the precipication of remaining vanadium at pH 1.7 also is not complete and recycle of the filtrate from this precipitation, which is necessary for high yields of chromium values, results in return of the remaining vanadium which thus builds up in concentration in the recovery system.

Also, it has heretofore been proposed to separate vanadium salts occurring in solutions of chromate salts by converting the vanadium salts to ammonium metavanadate and precipitating a barium salt of metavanadic acid from slightly ammoniacal dilute aqueous solutions containing the ammonium metavanadate, which procedure is disadvantageous as incomplete separation is experienced due to relative insolubility of barium chromate in ammoniacal solutions, co-precipitation of remaining iron and aluminum in the solution further contaminates the barium metavandate, and the extraneous ammonium ion must subsequently be removed from the main chroium liquors, whereby an extra step is added to the chrome recovery process.

It has also been proposed to precipitate a calcium salt of vanadic acid from slightly acid solutions containing vanadic ions, the acid being employed to prevent the precipitation of iron or aluminum hydroxides. The calcium precipitate is thereafter processed to recover the vanadium in the desired form. This method, however efficient it may be for recovery of vanadium values, is precluded by the solubility of calcium chromate in acid solutions, where chrome recovery is important since calcium chromate occurs as a contaminant of sodium bichromate in the ultimate bichromate recovery.

Moreover, it has heretofore been proposed to "hold back" vanadium salts from aqueous solutions obtained after the alkali roasting of chromite ores, by incorporating alkaline earth metal oxides with such ores, prior to the roasting. The alkaline earth metal oxides in the roast mix form vanadate salts which are relatively insoluble in water and are thus to some extent held back and not carried over into the chromate process liquors, when the roast is leached with water. In addition to the disadvantage that vanadium is only partially held back by such treatment and thus appreciable amounts of vanadium in soluble form are leached out with the chromium values, a further effect of this process is that the vanadium held back in the leached residue from the roast mix is thereafter unavailable for recovery by economically satisfactory methods, due to the large bulk of material which must be processed to recover the relatively small amount of vanadium present therein.

In contrast to these prior art proposals, the present invention contemplates a simple, efficient, cyclic method for the purification of chromate liquors and the recovery of vanadium values, in which method lead ions are utilized as a precipitant for the vanadium and may be recycled in the system without appreciable losses thereof and without contamination of the aqueous chromate liquors by extraneous ions. Moreover, the aqueous leach liquors, with which the vanadate and chromate salts are generally associated, are more highly refined by the method of the present invention with respect to the separation of these two components than those liquors obtainable by the prior art methods. The liquors, and chromate salts obtainable therefrom, are more useful in the preparation of tanning liquors and chromate pigments wherein the effect of vanadium compounds upon tanned animal hides, as well as their effect upon the hue and shade of the chromate pigments, is undesirable. Furthermore, the vanadium values are recovered in a form readily convertible to vanadium oxide or other suitable vanadium compounds for use in metallurgical processes and the like and hence, are of appreciable value to the conventional chromate process in that, in addition to the purer forms of chromate salts obtained, valuable vanadium compounds are also recovered.

Therefore, whether the primary object of the particular process under consideration is to remove vanadium compounds as contaminants of chromate liquors or to recover vanadium compounds per se from aqueous liquors obtained in the processing of materials containing vanadium and chromium, the perquisites of the method of the present invention are substantial and certain.

Referring now to the drawings, which form a part hereof,

Fig. 1 is a chemical process flow-sheet of a conventional alkali roast method of treating chrome ores to recover the chrome values therefrom, and Fig. 2 is a chemical process flow-sheet showing a preferred cyclic operation employing the method of the present invention.

The advantages referred to hereinabove may be more fully understood and appreciated by a description, first of a conventional process for the recovery and purification of chromate salts from chrome bearing ores, especially that exemplified by the process flow-sheet of Fig. 1, and second, by a description setting forth in detail the manner in which the method of the present invention is coordinated with such process, particularly a description of the method of the present invention following the process of Fig. 2.

Referring now to Fig. 1, the chrome bearing ore is comminuted and mixed with sodium carbonate and calcium oxide or dolomitic lime (CaO—MgO). One purpose of the sodium carbonate is to react with the chromium and aluminum oxides of the ore to form water-extractable compounds thereof. The lime is employed primarily to maintain a granular consistency in the roast mix during the roasting process, which may suitably be carried out in a rotary kiln or other convenient roasting means, and secondarily, to diminish the amount of water extractable vanadium salts formed during the roasting of the ore. The roasting of the mix is carried out at a temperature ranging between 2000° and 2200° F., after which the roast is cooled and leached with water. As a result of the leaching step, an aqueous liquor containing sodium chromate, sodium vanadate, sodium aluminate, and other salts, and an insoluble residue are obtained. The liquor and residue may be separated by filtration, as at filter No. 1. The residue is dried and combined with further amounts of sodium carbonate (this time without the addition of lime), as indicated by the dotted line to the left of the main stream of Fig. 1, and separately recycled in the roasting and leaching process hereinabove described, with the result that further amounts of the chrome values contained in the roast residue are thereby removed. The leach liquor from the first roast and the liquor from the recycle roast are combined and are designated in Fig. 1 as "raw liquor," and as shown, ordinarily have a pH within the range of 11–12.5. The "raw liquor" is treated with sulfuric acid (78%), or with acidic solutions recovered subsequently in the process, to bring the pH of the "raw liquor" within the range of 8.5–9 in order to precipitate alumina hydrate. The alumina hydrate is derived from aluminum oxide, which occurs in the ore in substantial quantities, of the order of 10–15%. The alumina hydrate may be separated from the aqueous partially neutralized liquors by filtration, as at filter #2, the filtrate then being referred to as "neutral liquor." The precipitate carries with it approximately ½ of the original vanadium values occurring in the "raw liquor," the remainder being carried into the "neutral liquor" as soluble vanadates.

The "neutral liquor" is next acidified with sulfuric acid (78%) to bring the pH of the solution to about 4.4, whereupon chromate ion is converted to bichromate ion in the solution. Thereafter the solution may be suitably concentrated, preferably to about 60° Bé., and then cooled to approximately room temperature. The concentration and cooling steps result in the crystallization of sodium sulfate, at crystallizer #1, the mother liquor comprising the chromate values as bichromates and the vanadium values as an acid or acid salt thereof. The crystallized sodium sulfate is removed from the mother liquor by centrifuging as at centrifuge #1. The acid mother liquor, after the removal of sodium sulfate, is referred to as "red liquor." The "red liquor" is further concentrated in order to crystallize the bichromate values therefrom. After suitable concentration, for example, to 70° Bé., sodium bichromate crystallizes from the concentrated "red liquor" at crystallizer #2 and is centrifuged at centrifuge #2 to remove the mother liquor, which liquor is designated as "return liquor." The crystals are the finished product of the process and are, if no "return liquor" has been used in makeup of the "red liquor," reasonably free of vanadium and other impurities. However, as pointed out more fully below, "return liquor" usually is employed and in such case, the crystals are contaminated with vanadium to an extent of between 0.2 and 1%, taken as sodium vanadate. This amount of vanadium is sufficient to cause substantial difficulty in tanning operations and to detract seriously from the value of the bichromate as a raw material for chromate pigments.

The "return liquor" carries with it appreciable amounts of the chrome values as well as the vanadium values which have not been removed with the bichromate crystals. Since the "return liquor" has a pH very close to that of the "red liquor" from a centrifuge #1, such "return liquor" is returned to the main stream via the "red liquor," for further concentration and crystallization of the bichromates dissolved therein, or is returned to the main stream as indicated by the dotted line to the right of the main stream of Fig. 1, as a part of the acid required to neutralize "raw liquor." It will be appreciated that such recycling of the "return liquor" ultimately results in accumulating an undesirable amount of vanadium salts within the system, which salts contaminate the bichromate crystals obtained therefrom and adversely affect the crystallization of bichromates. However, discarding the "return liquor" is not a solution to the problem as economically wasteful quantities of bichromates would be lost. Heretofore, various of the prior art expedients set forth above for avoiding vanadium build-up and excessive concentrations of vanadium in finished bichromate have been resorted to with little success.

In its broad aspect, the method of the present invention provides a simple and easily commercially adaptable process for the separation of vanadium and chromium. In particular, the present invention may, as pointed out above, be practiced on chromium and vanadium containing liquors, taken at any stage of the process of Fig. 1 and preferably prior to the crystallization of bichromate, or derived from other chrome ore treating processes. Additionally, the present invention is directed to the continuous method for separating chromium and vanadium values from solutions consisting essentially of "neutral liquors" or liquors obtained from leaching roasted chrome ores and from which substantially all the alumina has initially been removed. The separation of vanadium and chromium by direct treatment of "raw liquor", though disclosed in part herein, does not specifically form a part of the present invention but is disclosed and claimed in a co-pending application, Ser. No. 59,934, filed of even date herewith, in the name of one of the present inventors and another.

In the practice of the present invention, as applied to "neutral liquors," it is usually desired to recover substantially all of the vanadium values from the liquor or from an ore from which the liquor may be derived, such as a chromite ore. Therefore, it is in general preferable in the roasting of such an ore to omit the use of lime in the roast, as holding back of the vanadium reduces the ultimate yield thereof.

Referring to Fig. 2 of the drawing, wherein the treatment of "neutral liquor" or its equivalent by the method of the present invention is illustrated and wherein the dotted line "A" represents the main stream line of Fig. 1, a suitable lead compound, for example, a relatively water-insoluble lead compound, such as lead oxide, lead hydroxide, lead sulfate, or basic lead sulfate, or a relatively soluble lead compound, such as lead acetate or lead nitrate, where foreign ions are not objectionable, is made up into an aqueous slurry, or solution, and added to the concentrated "neutral liquor," as obtained in the process of Fig. 1. A precipitate is obtained consisting essentially of a major proportion of the vanadium as lead vanadate, a minor proportion of the chromium as lead chromate, and possibly some lead sulfate. The precipitate is separated from the mother liquor by filtration at filter 2-A, the filtrate therefrom being returned to the main stream of the process of Fig. 1 at the acidification step prior to crystallizer #1. The precipitation step results in a reduction of vanadate concentration in the main chromium process of Fig. 1 to within a tolerable limit, whereby the remainder of the steps of that process will produce a substantially vanadium-free bichromate.

The precipitate including the bulk of the vanadium may then be treated with dilute sulfuric acid, preferably in the ratio of about one volume of concentrated sulfuric acid to about two volumes of water, whereby the vanadate and chromate values of the precipitate are converted to soluble acids and the lead values thereof converted to insoluble lead sulfate. The insoluble lead sulfate is separated from the liquor containing the soluble vanadic and chromic acids by filtration and may be recovered as such, made up into an aqueous slurry, and recycled in the process as the vanadate and chromate precipitant.

If it is desired to recover the vanadium and chromate values from the precipitate, the filtrate, containing the vanadic and chromic acids, as well as sulfuric acid, may be treated first with an oxidizing agent, for example, chlorine in the form of sodium hypochlorite, and the thus oxidized compounds therein then reacted with an inorganic base, such as an alkali metal hydroxide or ammonium hydroxide, in an amount sufficient to form an insoluble salt of hexametavanadic acid. This is readily accomplished by adjusting the acidity of the solution within the pH range of 1 to 3, preferably about 2.5. The solution and insoluble vanadium salt are separated by filtration and the insoluble salt of hexametavanadic acid converted to the desired vanadium compound. The solution of sulfuric acid and chromic acid from the filtration of alkali metal or ammonium hexametavanadate is suitably recycled to the main stream of the conventional process and used to acidify "neutral liquor" when combined with suitable amounts of dilute sulfuric acid to give the desired pH therein.

Although lead compounds other than the lead oxide or lead sulfate, such as the soluble lead compounds, for example, lead acetate or lead nitrate, may be used to initiate the process of the present invention, it is preferable to employ lead sulfate since lead sulfate is recovered as such in normal course of the process and moreover is an efficient vanadate sequestering agent. Further, since lead sulfate, as recovered, may be recycled in the present process without diminishing its efficiency as a vanadate sequestering agent, there is no need to introduce extraneous ions into the "neutral liquor."

It has been found preferable, when employing lead sulfate, to form a thick paste of lead sulfate and water, or "neutral liquor," and to add this paste to the "neutral liquor" with vigorous agitation. As to the amount of lead sulfate which may be employed, it is in general preferable first to determine the amount of vanadate salt, calculated as sodium metavanadate, present in the "neutral liquor," and then to add to the "neutral liquor" lead sulfate, preferably in the ratio of 18-35 times the weight of the vanadate salt present. This is equivalent to 15-30 parts by weight of lead available in the solution per part by weight of vanadate calculated as $VO_3$. More dilute liquors with respect to chromate values, calculated as sodium chromate, as well as liquors containing vanadate salts, calculated as sodium metavanadate, in an amount less than 0.37 of 1% of such chromate values, require the higher weight ratios of lead sulfate to be added to the "neutral liquor" in order to effect the desired degree of removal of the vanadate ions therefrom.

In general, the time required to effect the desired degree of separation of the vanadate ion from the "neutral liquor" is of the order of 5-15 minutes, where vigorous agitation is used to disperse the slurry of lead sulfate in the "neutral liquor," and further, where the temperature during such agitation is maintained within the range of approximately 80-90° C.

In the dissolution of the lead chromate-vanadate coprecipitate, the amount of dilute sulfuric acid employed may be equivalent to, or slightly more than equivalent to, the amount of lead sulfate originally added to the "neutral liquor," for example, about 1.2 mols of sulfuric acid for each mol of lead sulfate originally introduced into the "neutral liquor."

In order to remove the vanadium from the sulfuric acid extract solution comprising vanadic acid, chromic acid, and sulfuric acid, it is preferred to concentrate the solution to such a degree that it contains approximately 20 grams per liter of vanadate salt, calculated as sodium metavanadate. When this degree of concentration has been attained, the acidity of the solution is suitably adjusted within the pH range of 1 to 3 and the solution agitated while heating, for example, at 85–100° C., for a period of the order of three hours. Where it is desired to recover substantially all of the vanadium present in the "neutral liquor" in accordance with the foregoing step, the vanadium is preferably in its highest state of oxidation. To this end, it is desirable, prior to adjusting the acidity of the solution to a point within the above indicated pH range, that sodium hypochlorite, or other suitable oxidizing agent, be added to the solution in an amount at least equivalent chemically to all of the vanadium therein, in order to insure that substantially all of the vanadium is oxidized to this state. The pH may then be adjusted, after the oxidation step, by adding suitable alkaline material, such as soda ash, caustic soda, or the like, in order to form an insoluble salt of hexametavanadic acid. The salt, which results when a sodium bearing alkaline material is added to the acid extract, is presently believed to be sodium dihydrogen hexametavanadate, $Na_2H_2V_6O_{17}$, since the salt obtained in the process analyzes 85% $V_2O_5$, 9% $Na_2O$, and 2.5% $H_2O$; the theoretical values are 87% $V_2O_5$, 9.9% $Na_2O$, and 2.9% $H_2O$.

In order that those skilled in the art may become more familiar with the details of the method of the present invention and a preferred manner by which the same may be carried into effect, the following specific example is offered:

EXAMPLE

Removal of vanadium 68 liters of "neutral liquor" concentrated to 29° Bé., containing 33.5 kilograms of sodium chromate, and 46 grams of sodium metavanadate, are heated to 80° C. with agitation. 897 grams of a dry lead sulfate are slurried with sufficient water to make a thick heavy pulp or paste. This amount of lead sulfate gives a ratio of lead sulfate to sodium vanadate of about 20:1, which ratio is the equivalent of 7.9 mols of lead per mol of sodium metavanadate. The mixture of lead sulfate and "neutral liquor" is agitated for a period of about 10 minutes at a temperature within the range of 80° C. to 90° C. The reaction mass is filtered to remove the co-precipitate of lead chromate and lead vanadate, and any excess lead sulfate, from the mother liquor. The mother liquor now contains 33 kilograms of sodium chromate, together with 2.6 grams of sodium metavanadate. This amounts to approximately 94.4% removal of the vanadium values contained in the "neutral liquor."

Recovery of vanadium 1250 grams of the wet filter cake comprising lead sulfate, lead vanadate, and lead chromate are treated with a mixture of 524 grams of 100% sulfuric acid and 600 ml. of water, which mixture amounts to a dilution of the sulfuric acid of about 1:2 by volume. The filter cake and dilute sulfuric acid are agitated together for a period of approximately 5 minutes at a temperature near the boiling point of the solution. At the end of this time, 800 ml. of water are added to the hot solution and the diluted solution then subjected to filtration. The filter cake obtained by this filtration is washed and a portion thereof dried to determine its moisture content; the dry weight of the filter cake is calculated to be 900 grams, showing a complete recovery of the lead sulfate for recycle purposes. The dried portion and the wet filter cake are combined and again slurried with water to a thick paste and recycled in the process.

The filtrate is acted upon with 6 grams of chlorine in the form of 10% aqueous hypochlorite, and thereafter 150 grams of NaOH are added to adjust the pH of the solution to 2.5. The partially neutralized solution is agitated at a temperature between 85–90° C. for a period of three hours. Up to this point, the volumes of the aqueous reagents used in the process have been so controlled that after the addition of the sodium hydroxide, the amount of vanadium salt, calculated as sodium metavanadate, in the solution is approximately 20 grams per liter. After the three-hour period of agitation and digestion at the temperature given above, the reaction mixture is allowed to stand over-night at room temperature. After this holding time, the solution is filtered and a filter cake obtained which, when dried at 110° C., weighs 31.3 grams and contains 34.5 grams of hexametavanadate salt, which amounts to 78.4% vanadate recovery based on the amount originally removed from the "neutral liquor." The filtrate from this last filtration contains 224 grams of chromate salt calculated as sodium bichromate dihydrate, together with 3.4 grams of vanadate salt, calculated as sodium metavanadate. This filtrate is recycled in the process to the reactor, wherein the lead sulfate initially contacts the "neutral liquor." Upon recycling the lead sulfate with further "neutral liquor" of substantially the same volume and concentration as the initial run, together with the filtrate obtained subsequent to the precipitation of the hexametavanadic acid salt, the percentage of vanadium recovered varies from about 90% to substantially 100% of that originally removed from the "neutral liquor," as compared with the 78.4% obtained in the initial run. The volume of the acid filtrate recycled is small compared to the volume of "neutral liquor" with which it is combined and hence, the pH of the "neutral liquor" is not materially lowered, i. e. the pH of the "neutral liquor" does not drop below 8 because of the addition thereto of the acid filtrate.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of purifying alkali metal chromate solutions with respect to vanadium, which includes the steps of providing a source of lead ions in an aqueous solution comprising chromates and vanadates, said source of lead ions being added to the solution in an amount sufficient to provide 15–30 parts by weight of lead per part by weight of vanadate calculated as VO₃ to co-precipitate substantially all of the vanadate ions and a minor proportion of the chromate ions from said solution as their lead salts, and separately recovering the substantially vanadium-free chromate solution.

2. The method of purifying alkali metal chromate solutions with respect to vanadium, which includes the steps of providing a source of lead ions in an aqueous solution comprising a preponderance of alkali metal chromates and a minor proportion of alkali metal vanadates, said source of lead ions being added to the solution in an amount sufficient to co-precipitate substantially all of the vanadate ions and a minor proportion of the chromate ions from said solution as their lead salts, and separately recovering the substantially vanadium-free chromate solution.

3. The method of purifying alkali metal chromate solutions with respect to vanadium, which includes the steps of combining a solution comprising a preponderance of alkali metal chromates and a minor proportion of alkali metal vanadates with a relatively water-insoluble inorganic lead compound in an amount sufficient to co-precipitate substantially all of the vanadate ions and a minor proportion of the chromate ions from said solution as their lead salts, and separately recovering the substantially vanadium-free chromate solution.

4. The method of purifying alkali metal chromate solutions with respect to vanadium, which includes the steps of providing a source of lead ions in an aqueous solution comprising a preponderance of alkali metal chromates and a minor proportion of alkali metal vanadates, said source of lead ions being added to the solution in an amount sufficient to co-precipitate substantially all of the vanadate ions and a minor proportion of the chromate ions of said solution as their lead salts, separating the co-precipitate from the remainder of said solution, recovering the lead values from said co-precipitate as lead salts other than lead chromate and lead vanadate, and recycling said lead values to said solution of said chromate and vanadate salts as said source of lead ions.

5. The method of purifying alkali metal chromate solutions with respect to vanadium and recovering vanadium from such solutions, which includes the steps of providing a source of lead ions in an aqueous solution comprising a preponderance of alkali metal chromates and a minor proportion of alkali metal vanadates, said source of lead ions being added to said solution in an amount sufficient to co-precipitate substantially all of the vanadate ions and a minor proportion of the chromate ions of said solution as their lead salts, separately recovering a substantially vanadium-free chromate solution and said co-precipitate, contacting said co-precipitate with sulfuric acid to convert said lead salts to insoluble lead sulfate and soluble acids of vanadium and chromium, separating said insoluble lead sulfate from the acid solution, introducing an oxidizing agent into said acid solution and adjusting the pH of said acid solution to a point within the range of 1-3, thereby to precipitate the vanadium values of said acid solution as a salt of hexametavanadic acid, and separating said salt from said solution.

6. The method of purifying alkali metal chromate solutions with respect to vanadium and recovering the vanadium values from such solutions, which includes the steps of combining a solution comprising a preponderance of alkali metal chromates and a minor proportion of alkali metal vanadates with a relatively water-insoluble inorganic lead compound, in an amount sufficient to provide 15-30 parts by weight of lead per part by weight of vanadate calculated as VO₃ to co-precipitate substantially all of the vanadate ions and a minor proportion of the chromate ions of said solution as their lead salts, separating the co-precipitate from the remainder of said solution, contacting said co-precipitate with sulfuric acid, thereby to convert said lead salts to insoluble lead sulfate and a solution comprising soluble acids of vanadium and chromium, separating said insoluble lead sulfate from said acid solution, introducing an oxidizing agent into said acid solution and adjusting the pH of said acid solution to a point within the range of 1-3, thereby to precipitate the vanadium values of said acid solution as a salt of hexametavanadic acid, and separating said vanadium salt from said acid solution.

7. The method of purifying alkali metal chromate solutions with respect to vanadium and recovering the vanadium values from such solutions, which includes the steps of providing a source of lead ions in an aqueous solution comprising a preponderance of alkali metal chromates and a minor proportion of alkali metal vanadates, said source of lead ions being added to said solution in an amount sufficient to co-precipitate substantially all of the vanadate ions and a minor proportion of the chromate ions of said solution as their lead salts, separating the co-precipitate from the remainder of said solution, contacting said co-precipitate with aqueous sulfuric acid, thereby to convert said lead salts to insoluble lead sulfate and a solution comprising soluble acids of vanadium and chromium, separating said insoluble lead sulfate from the acid solution, recycling said insoluble lead sulfate to said solution of alkali metal chromates and vanadates as said source of said lead ions, introducing an oxidizing agent into said acid solution and adjusting the pH of said acid solution to a point within the range of 1-3, thereby to precipitate the vanadium values of said acid solution as a salt of hexametavanadic acid, and separately recovering said vanadium salt.

8. The method of purifying alkali metal chromate solutions with respect to vanadium and recovering the vanadium values from such solutions, which includes the steps of providing a source of lead ions in an aqueous alkaline solution comprising a preponderance of alkali metal chromates and a minor proportion of alkali metal vanadates, said source of lead ions being added to said solution in an amount sufficient to co-precipitate substantially all of the vanadate ions and a minor proportion of the chromate ions of said solution as their lead salts, separating the co-precipitate from the remainder of said alkaline solution, contacting said co-precipitate with sulfuric acid, thereby to convert said lead salts to insoluble lead sulfate and a solution comprising soluble acids of vanadium and chromium, separating said insoluble lead sulfate from said acid solution, recycling said insoluble lead sulfate to said alkaline solution of chromates and vanadates as said source of lead ions, introducing an oxidizing agent into said acid solution and adjusting the pH of said acid solution to a point within the range of 1-3, to precipitate the vanadium values of said acid solution as a salt of hexametavanadic acid, and recovering said vanadium salt from said acid solution.

9. The method of purifying alkali metal chromate solutions with respect to vanadium and recovering the vanadium values from such solutions, which includes the steps of combining an aqueous solution comprising a preponderance of alkali metal chromates and a minor proportion of alkali metal vanadates with a source of lead ions in an amount sufficient to co-precipitate substantially all of the vanadate ions and a minor proportion of the chromate ions of said solutes as their lead salts, separating the co-precipitate from the remainder of said solution, contacting said co-precipitate with sulfuric acid, to convert said lead salts to insoluble lead sulfate and a solution comprising soluble acids of vanadium and chromium, separating said lead sulfate from said acid solution, recycling said lead sulfate to said solution of chromates and vanadates, introducing an oxidizing agent into said acid solution and adjusting the pH of said acid solution to precipitate the vanadium values of said acid solution as a salt of hexametavanadic acid, separating said vanadium salt from said acid solution, and recycling the remainder of said acid solution to further solutions of chromates and vanadates.

10. This method of purifying alkali metal chromate solutions with respect to vanadium and recovering the vanadium values from such solutions, which includes the steps of combining an aqueous solution comprising a preponderance of alkali metal chromates and a minor proportion of alkali metal vanadates with a water-insoluble inorganic lead compound in an amount sufficient to provide 15-30 parts by weight of lead per parts by weight of vanadate calculated as $VO_3$ to co-precipitate substantially all of the vanadate ions and a minor proportion of the chromate ions of said solutes as their lead salts, separating the co-precipitate from the remainder of said alkaline solution, contacting said co-precipitate with sulfuric acid, to convert said lead salts to insoluble lead sulfate and a solution comprising soluble acids of vanadium and chromium, separating said insoluble lead sulfate from said acid solution, recycling said insoluble lead sulfate to said alkaline solution of chromates and vanadates as said insoluble lead compounds, introducing an oxidizing agent into said acid solution and adjusting the pH of said acid solution to a point within the range of 1-3, thereby to precipitate the vanadium values of said acid solution as a salt of hexametavanadic acid, separating said vanadium salt from said acid solution, and recycling the remainder of said acid solution to said alkaline solutions of chromates and vanadates.

TOM S. PERRIN.
JAMES N. JENKINS.

REFERENCES CITED

The following references are of record in the file of this patent:

UNITED STATES PATENTS

| Number | Name | Date |
|---|---|---|
| 1,015,469 | Bleecker | Jan. 23, 1912 |
| 1,065,582 | Bleecker | June 24, 1913 |
| 1,286,400 | Pellagrin | Dec. 3, 1918 |
| 1,597,216 | Stokes | Aug. 24, 1926 |
| 1,784,950 | Udy | Dec. 16, 1930 |

FOREIGN PATENTS

| Number | Country | Date |
|---|---|---|
| 11,726 | Great Britain | of 1911 |
| 289,105 | Great Britain | Apr. 20, 1928 |